United States Patent [19]

Meijer

[11] Patent Number: 4,707,990
[45] Date of Patent: Nov. 24, 1987

[54] SOLAR POWERED STIRLING ENGINE

[75] Inventor: Roelf J. Meijer, Ann Arbor, Mich.

[73] Assignee: Stirling Thermal Motors, Inc., Ann Arbor, Mich.

[21] Appl. No.: 19,651

[22] Filed: Feb. 27, 1987

[51] Int. Cl.⁴ .............................................. F03G 7/02
[52] U.S. Cl. .................................. 60/641.15; 60/641.8
[58] Field of Search .......................... 60/641.8, 641.15

[56] References Cited

U.S. PATENT DOCUMENTS

| | | | |
|---|---|---|---|
| 3,152,260 | 10/1964 | Cummings | 60/641.15 X |
| 4,002,032 | 1/1977 | Bash | 60/641.15 |
| 4,010,614 | 3/1977 | Arthur | 60/641.15 |
| 4,030,890 | 6/1977 | Diggs | 60/641.15 |
| 4,335,578 | 6/1982 | Osborn et al. | 60/641.8 |
| 4,586,334 | 5/1986 | Nilsson, Sr. et al. | 60/641.8 X |

Primary Examiner—Allen M. Ostrager
Attorney, Agent, or Firm—Harness, Dickey & Pierce

[57] ABSTRACT

The effectiveness of the lubrication system of a Stirling engine is maintained in a solar dish module for all directions of aiming of the dish by the journal mounting of the engine on the dish module with the center of gravity of the journaled mass eccentric to the journal axis along a particular radial. The engine has a sump which is disposed at a low point of the engine. The center of gravity of the journaled mass lies along a radial from the journal axis which intersects the sump. An additional counterweight is added to achieve the desired eccentricity.

9 Claims, 4 Drawing Figures

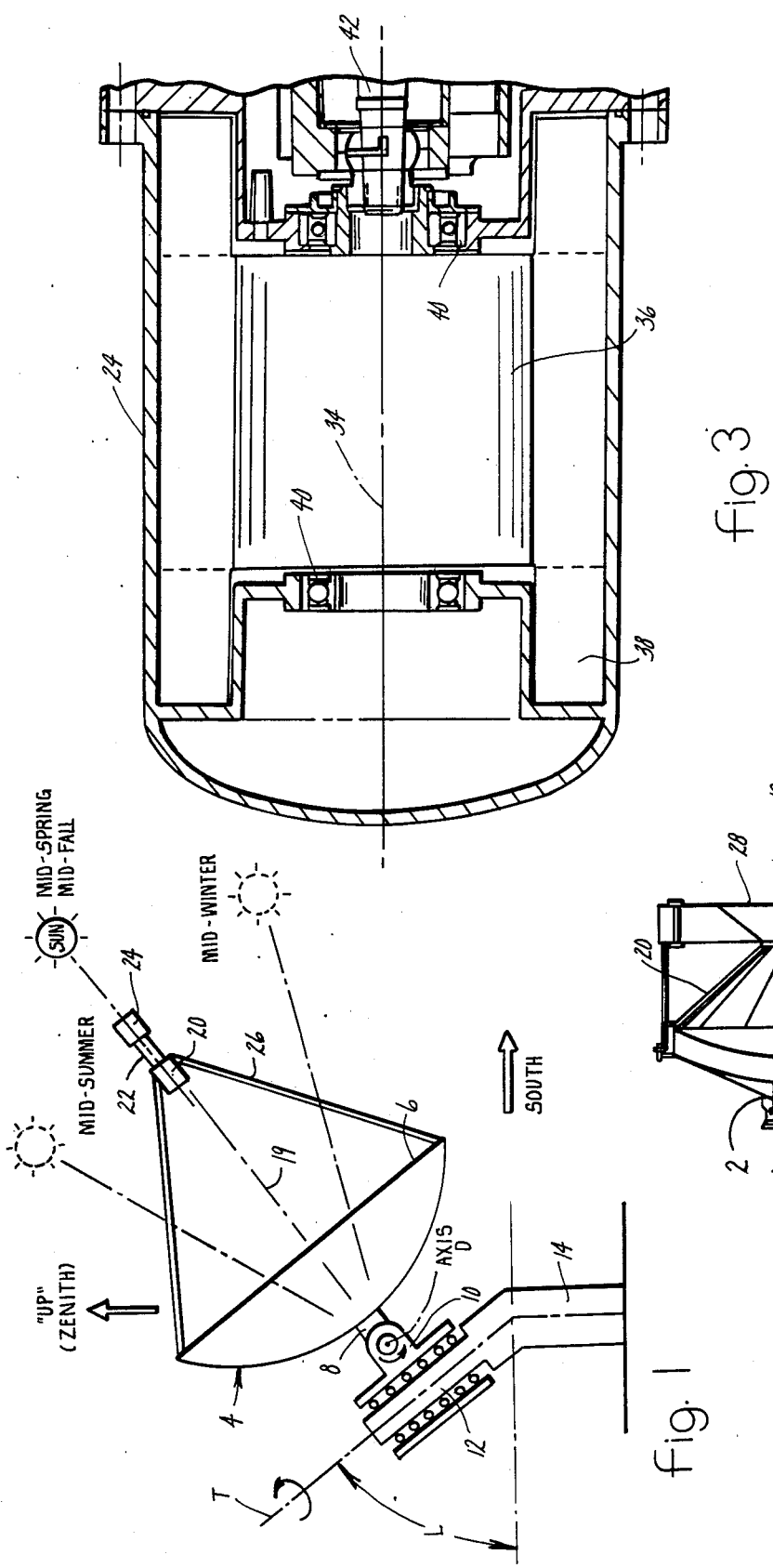
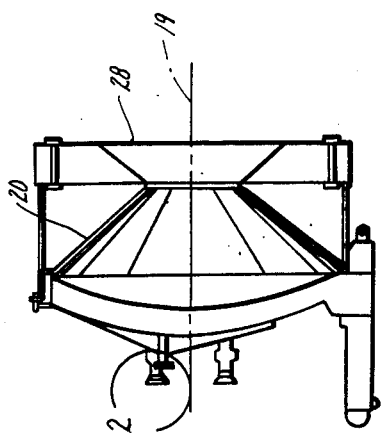
fig. 1
fig. 3
fig. 4

SOLAR POWERED STIRLING ENGINE

This invention relates to a solar powered engine and specifically to a new and unique arrangement for mounting a hot gas engine, such as a Stirling cycle engine, in association with a solar dish collector.

It has heretofore been proposed to generate electricity from solar power by utilizing the overall combination of a solar dish collector, a hot gas engine, and an electric generator. In general the dish is aimed at the sun to reflect incident sunlight onto the receiver which is located at the dish's focus. The heat energy so collected is utilized to drive a hot gas engine such as a Stirling engine, which is mounted adjacent the receiver. The engine in turn drives the generator to create electric power.

Preferably the combination of receiver, engine and generator is organized and arranged to cast as small a shadow as possible on the dish. Hence it is desirable for the receiver, engine and generator to be generally coaxially arranged along the axis of the dish. They are supported at a spaced distance from the dish by a framework which extends back to the dish.

In order to efficiently operate a solar powered system which has a dish, it is important that the dish be continuously aimed in the direction of incident sunlight. Hence dishes typically comprise tracking systems which develop the correct combination of azimuth and elevation motions to keep the dish pointed at the sun. During the course of a solar tracking day, from early morning to late afternoon, the dish tracks the sun along an arc which has continuously increasing azimuth. The elevation begins at or near the horizon in the east, and increases until midday. Thereafter the elevation decreases toward the western horizon.

Depending upon time of year and latitude at which it is located, any given solar dish module may track an arc which spans a significant range of azimuth and elevation motions. Indeed the amount of azimuthal motion in the course of a day of solar tracking may span an arc considerably more than 180 degrees, and in fact a dish module may have a full 360 degrees azimuthal rotational range. Likewise a full elevational range of motion will extend from horizon to zenith.

The exact manner in which the composite dish motion (meaning combination of azimuth and elevation motions) is generated depends on the dish module mechanism. Different modules are constructed with different mechanisms for creating the desired composite motion. Regardless of the module mechanism, mounting of a receiver-engine-generator combination on a dish module in the general manner described above results in the axis of the combination being aimed in the same direction as the dish is pointed.

The present invention arises through recognition that mounting of what would be considered as a standard engine on at least certain kinds of dish modules will subject the engine to spatial orientations which are significant departures from what would be considered normal spatial orientations. For example, a standard engine is designed with the intent that it will be used generally upright and with its axis generally horizontal. When mounted on a dish module, however, such an engine will experience departures from this intent. Depending upon the particular dish mechanism, these departures can be considered analogous to roll, and/or pitch, and/or yaw. Engine designs can usually tolerate certain degrees of departure in these components of spatial displacement; however, there are limits and therefore, engine considerations impose restrictions on the range of motion for at least certain kinds of dish modules.

One especially critical aspect of engine operation involves the lubrication system. The usual engine requires lubrication of its moving internal parts, and therefore has an internal lubrication system for delivering lubricant to them. Generally a pump draws lubricant from a sump and delivers it to the points requiring lubrication, with the lubricant subsequently returning to the sump. By its nature, this type of lubrication system depends on gravity and therefore is sensitive to the spatial orientation of the engine. For example, if the engine is tipped too much so that it is no longer within its range of uprightness, the lubrication system becomes ineffective because lubricant cannot be drawn from nor returned to the sump.

Fixed mounting of a Stirling engine on certain types of dish modules therefore inherently imposes restrictions on dish aiming and may consequently limit the range of solar tracking. If the engine is tipped beyond the ability of the lubrication system to deliver ample lubricant to moving parts, the engine may fail.

The present invention is directed to an improvement in the basic dish-receiver-engine combination described above which enables a conventional engine to be utilized effectively without modification to the engine mechanism, particularly its internal workings and lubrication system, in solar dish modules where the engine would otherwise be subjected to tipping beyond its range of uprightness.

The present invention in a preferred embodiment comprises mounting at least the engine on the dish module so that predetermined spatial orientation of the engine is maintained throughout the range of pointing of the dish. In the disclosed embodiment this is done by journaling the engine on an axis which is either coaxial or parallel with the axis of the dish. By journaling the engine such that its center of gravity is eccentric to the journal axis, along a particular radial to the dish axis, the engine maintains a particular uprightness irrespective of the direction in which the dish is pointed such that the engine's lubrication system remains effective. In other words the pump stays in communication with the supply of lubricant in the sump so that lubricant continues to be delivered to moving parts, and returns to the sump.

The receiver axis is preferably arranged coaxial with the dish so that maximum solar energy collection is assured. Generally the receiver will be attached to the engine so that journaling of the engine on the dish inherently journals the receiver as well. With the receiver coaxial with the dish and the receiver surface essentially symmetrical about the receiver axis, the journaling of the receiver with the engine does not impair its efficiency. However, the preference for coaxially arranging the receiver with the dish in conjunction with the particular engine and receiver and their attachment to each other may result in the engine's center of gravity being other than along the radial which will yield the preferred uprightness. Consequently, a counterweight of appropriate mass is associated with the receiver-engine combination at an appropriate location such that the proper center of gravity of the combination is achieved for causing the combination to continuously assume the preferred uprightness which enables lubricant to be delivered to the engine's moving parts for all directions of dish pointing.

Since existing dish modules already comprise a framework for supporting the receiver-engine-generator combination on the dish, the only change which is necessitated with incorporation of the present invention is inclusion of a journal mounting of the combination on the framework and possibly a counterweight. Journaling can be accomplished with conventional components including, for example, ball and/or roller bearing assemblies. The counterweight, if required, can be nothing more than a mass of any dense inexpensive material suitably mounted on the engine-receiver combination.

The invention is described with reference to the accompanying drawings which portray a preferred embodiment according to the best mode presently contemplated.

BRIEF DESCRIPTION OF THE DRAWINGS

FIG. 1 is an elevational view of the dish receiver and Stirling engine combination of the present invention and illustrating the directional and seasonal orientation of the receiver.

FIG. 3 is a fragmentary view, partly in section and on an enlarged scale, in the same direction as the view of FIG. 2 illustrating more detail.

FIG. 4 is a side view of the receiver which forms a part of the structure shown in FIG. 2 and only a fragment of which is shown in FIG. 2.

DESCRIPTION OF THE PREFERRED EMBODIMENT

Figure 2:
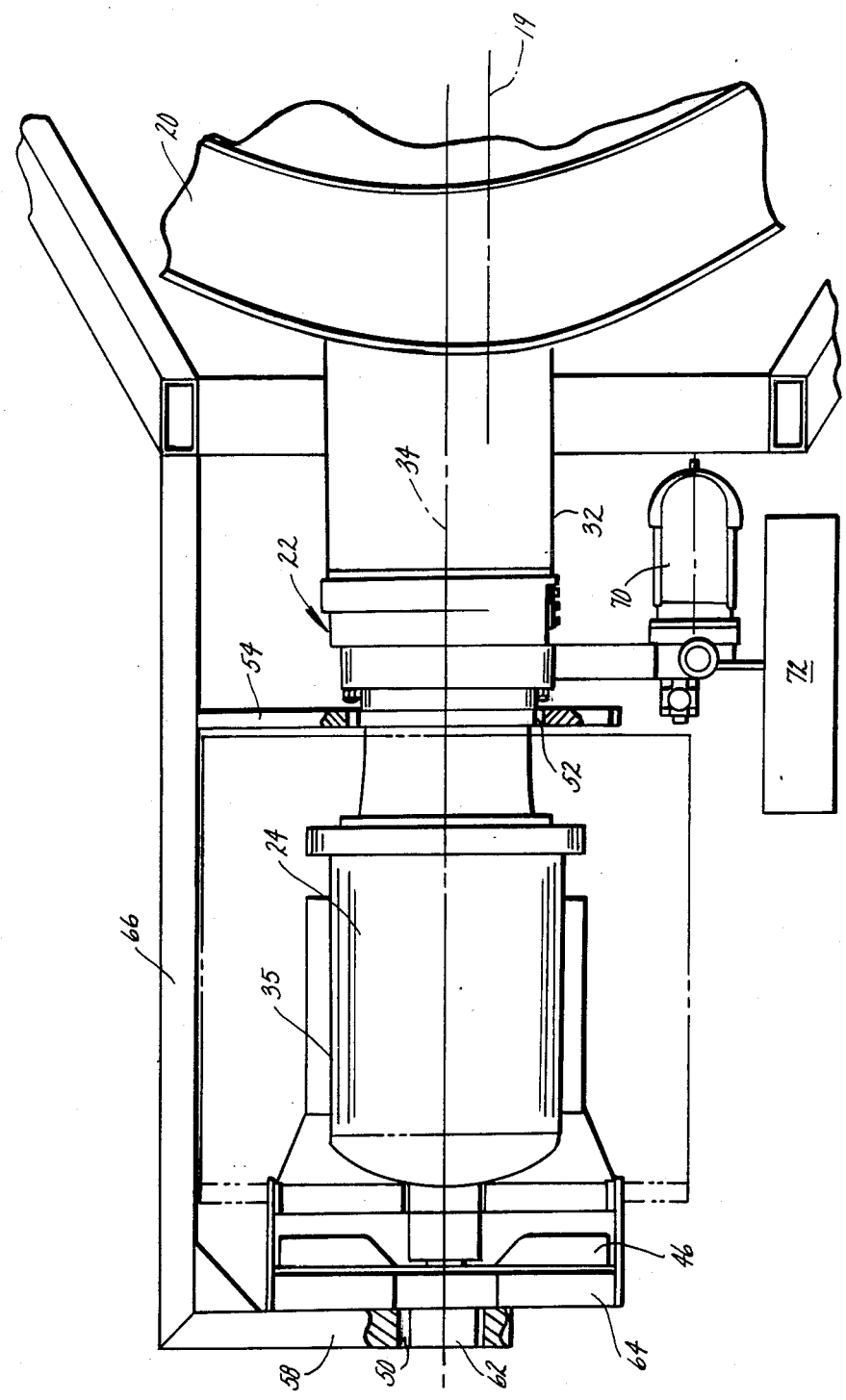
FIG. 2 is an enlarged fragmentary longitudinal sectional view of the engine-receiver structure.

FIG. 1 shows a dish collector module 4 comprising a parabolic reflecting dish 6 which is supported for azimuthal and elevational motions. The dish 6 is supported on the outer end of an arm 8 that is pivotally supported at its inner end on a bracket 10 for up and down movement about an axis D. Arm 8 can be inclined from the vertical 12 angularly about the horizontal axis D passing through the arm and the bracket 10. The bracket 10 is rotatably supported on upwardly inclined leg 12 of fixed support 14 so that the dish module 4 can be rotated about axis T.

Appropriate motive means are used to impart rotational motion to the dish about axis T and to the arm 8 about axis D and there are suitable controls associated with the motive means for causing the dish to track the sun as it travels across the sky. Such motive means and controls are conventional and will not be explained in further detail here. Suffice it to say that the controls operate to keep the dish axis 19 pointed at the sun, parallel with the direction of incident sunlight.

The dish 6 serves to concentrate the solar rays which are incident upon it by reflecting them to the focal point at which a solar receiver 20 is located. Mounted in association with receiver 20 are a Stirling engine 22 and an electric generator 24. The combination of receiver, Stirling engine, and generator is supported by suitable structural framework 26. Further details of the receiver 20, engine 22 and generator 24 are illustrated in FIGS. 2-4.

Receiver 20 (FIG. 4) is of cylindrical tapering shape. It is disposed coaxial with dish axis 19, and comprises an aperture 28 which is open toward the dish. Aperture 28 is coaxial with axis 19 and has a frustoconical shape and a size to expose essentially the entire of the interior receiver surface of the receiver 20 to the reflected solar rays. Particular details of the receiver are not important insofar as general principles of the present invention are concerned since the receiver is essentially conventional. It comprises any suitable construction which is effective to absorb the solar energy and transfer the heat to engine 22. For example, one means of doing this is by a suitable medium which is heated in the receiver, circulated to the engine where it gives up heat to the engine, and then is recirculated back to the receiver for reheating.

The end of receiver 20 opposite aperture 28 is attached to the housing 32 of engine 22, and any suitable form of connection may be employed. Particular details will depend upon the specific engine and receiver involved. The joining of the receiver to the engine can be advantageous for this embodiment of the invention if the receiver makes a positive contribution to the preferred uprightness of the engine. The axis of the engine output is identified by the reference numeral 34 and it can be seen in FIG. 2 that this axis 34 is eccentric relative to axis 19. Engine 22 may be any suitable type, and an exemplary type of engine is depicted in U.S. Pat. No. 4,481,771, commonly assigned.

Electric generator 24 has a frame 35 which is attached to engine housing 32 by any suitable means of attachment. Referring to FIG. 3, generator 24 comprises a rotor 36 and a stator 38. Rotation of rotor 36 is effective to generate electric voltage in stator 38 which in turn can be delivered to any desired means of utilization which requires electric power. Details of the generator are conventional and therefore will not be described. It is sufficient to note that rotor 36 is journaled in bearings 40 on the generator frame. Engine 22 has an output shaft 42 along axis 34 connected to drive rotor 36, ths axis of the generator being coaxial with axis 34.

FIG. 2 also portrays a fan 46 at the end of generator 24 opposite engine 22. The fan may be connected to the rotor so that the engine, in addition to driving the rotor, also drives the fan. In this way fan 46 will be effective to draw cooling air across the electric generator's frame.

The receiver-engine-generator combination is journaled on framework 26 about the axis 34. The two points of journaling are at main bearings 50 and 52.

The main bearing 52 comprises a bearing plate 54 arranged perpendicular to axis 34 and containing a large roller bearing assembly 52 which journals the circular wall of the engine housing.

The main bearing 50 includes a bearing plate 58 which journals a shaft 62. This shaft 62 is a part of a sub-frame 64 which is attached to generator frame 35. The two main bearing plates 54, 58 are supported from a beam 66 which is parallel to the journal axis so that the parts 54, 58, 66 cooperatively form what may be considered as an inverted cradle.

Assuming that axes 19 and 34 are horizontal, FIG. 2 portrays the usual spatial orientation of the engine with the engine being upright. In this orientation, the oil sump 70 associated with the engine is disposed at essentially the lowest point of the engine. The engine will continue to operate properly so long as this relationship is maintained because the internal lubrication pump (not visible) will be able to draw lubricant from the sump and deliver it to the moving internal parts, and the lubricant will then return to the sump. However, beyond certain deviations from this relationship, the lubrication system will no longer be effective to draw oil out of the sump, and consequently the engine will be prone to failure due to loss of lubrication. The particular amount of deviation beyond which the lubrication system becomes ineffective is to a certain extent a function of the particular engine design.

According to the present invention, the center of gravity of the journaled mass is arranged eccentric to the journal axis such that the sump is consistently maintained vertically below the engine axis 34, in the manner portrayed in FIG. 2, regardless of the direction in which the dish is aimed. The engine axis 34 does experience tipping but that tipping is due to the angular elevational component of dish axis 19.

By having the center of gravity of the journaled mass lie between axis 34 and sump 70, the engine-receiver-generator combination will assume a single unique circumferential orientation about the journal axis to thereby define a preferred uprightness for the engine. This unique orientation serves to maintain the sump 70 at essentially the lowest point of the engine regardless of direction in which the dish is pointed.

One way to achieve proper center of gravity is by attaching counterweight 72 to the engine directly below sump 70 as shown in FIG. 2. The mass of the counterweight is sufficient in relation to the distance from the journal axis that a sufficient torque is produced to overcome the inertia and friction of the journaled mass so that as the inverted cradle of parts 54, 58, 66 is angularly positioned about the journal axis over a range of positions due to solar tracking of the dish, the journaled mass maintains sump 70 in a vertical plane which is radial to axis 19. For any given engine-receiver-generator combination, the center of gravity may be other than the one just described. Therefore use of a counterweight to achieve the desired placement for the center of gravity will in all likelihood be needed.

While tipping of the engine will occur as dish axis 19 is increasingly elevated, the sump will nonetheless remain at the lowest point of the engine so that a sufficient lubrication delivery is assured.

In the absence of the journal feature of the present invention, a fixed mounting of the engine on the illustrated dish would result in the sump being, at times, other than directly vertically below the engine where it could possibly experience lubrication system failure on account of the gravity-sensitive nature of the system. With the present invention that possibility is eliminated.

Although the illustrated embodiment comprises the use of a separate counterweight, it will be appreciated that other embodiments may have the particular constructions and arrangements of the engine-receiver-generator such that they inherently produce the proper counterweighting without additional weight. Likewise in certain applications of the invention, journaling of the engine alone and/or in combination with only one of either the receiver and generator may be satisfactory. Also forms of loads other than an electric generator could conceivably be driven by the engine although it is expected that electric power generator will be the most common usage for solar powered dish modules.

What is claimed is:

1. In a solar dish module which comprises a dish which receives incident solar rays and reflects them to a focus at which is located the combination of a receiver and a heat engine organized and arranged so that the heat energy of the reflected solar rays collected at the receiver powers the engine, and wherein the receiver and heat engine are supported from the dish by a framework, the improvement which comprises journal means for journaling at least the engine on the framework to maintain certain predetermined spatial orientation for the engine in relation to the direction of gravity irrespective of spatial orientation of the dish.

2. The improvement set forth in claim 1 in which the certain predetermined spatial orientation for the engine is maintained by having the journal axis in the same direction as the dish axis.

3. The improvement set forth in claim 2 in which the journal means comprises a pair of main bearings axially spaced apart.

4. The improvement set forth in claim 3 in which the collector is attached to the engine so as to be journaled via the engine on the framework.

5. The improvement set forth in claim 4 wherein said collector has a longitudinal axis located below said journal axis.

6. The improvement set forth in claim 1 in which the engine has a lubrication system including a sump and the center of gravity of the total mass journaled by the journal means is effective to maintain the sump intersected by a vertical plane which passes through the journal axis.

7. The improvement set forth in claim 6 including a counterweight supported from the engine to cause the center of gravity of the total journaled mass to be so effective.

8. The improvement set forth in claim 1 wherein the engine has a journal axis and a lubrication system including a sump and wherein said predetermined spatial orientation is one in which said sump is below said engine and said receiver is also positioned so that its center of gravity is below the journal axis of said engine.

9. The improvement set forth in claim 8 further including a counterweight secured to said engine and positioned below the center of gravity of the total mass journaled on said axis.

* * * * *